F. AMIOT.
METHOD OF CONNECTING HOLLOW METAL PARTS.
APPLICATION FILED SEPT. 20, 1916.
1,250,411.
Patented Dec. 18, 1917.
2 SHEETS—SHEET 1.
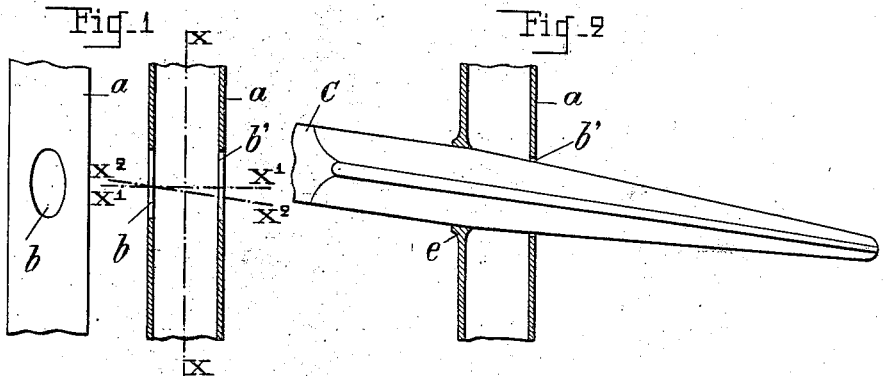
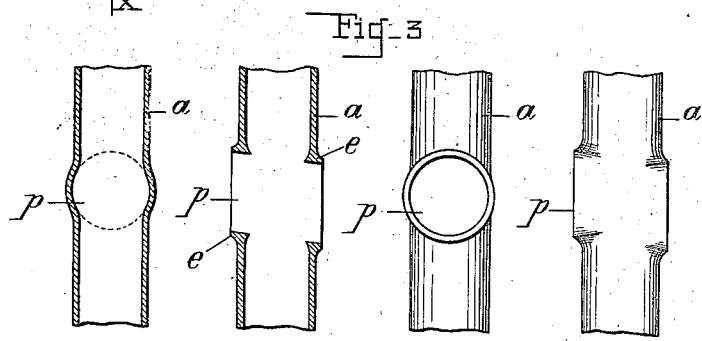
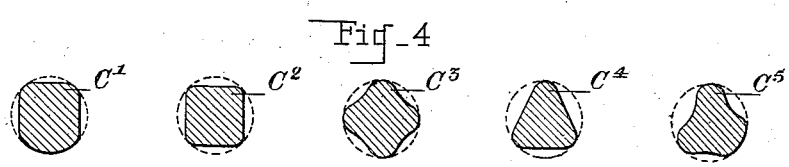
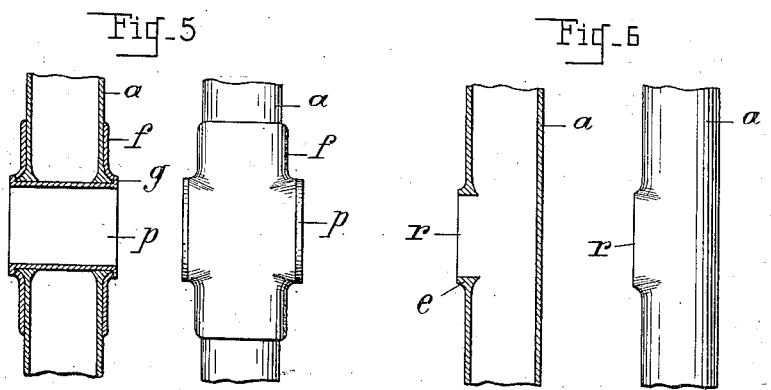
INVENTOR:
FELIX AMIOT
BY: H van Dedemuel
ATTORNEY.

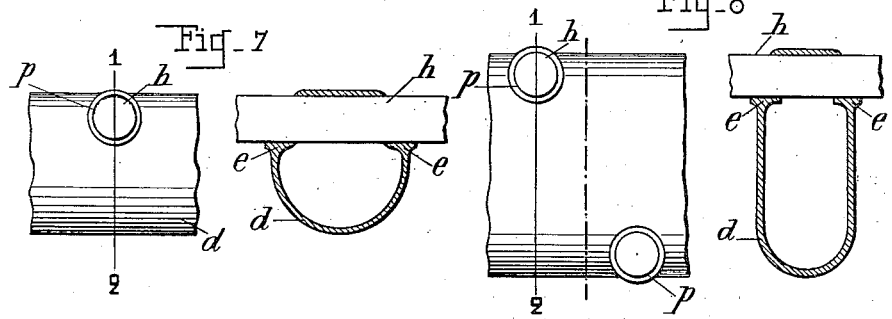
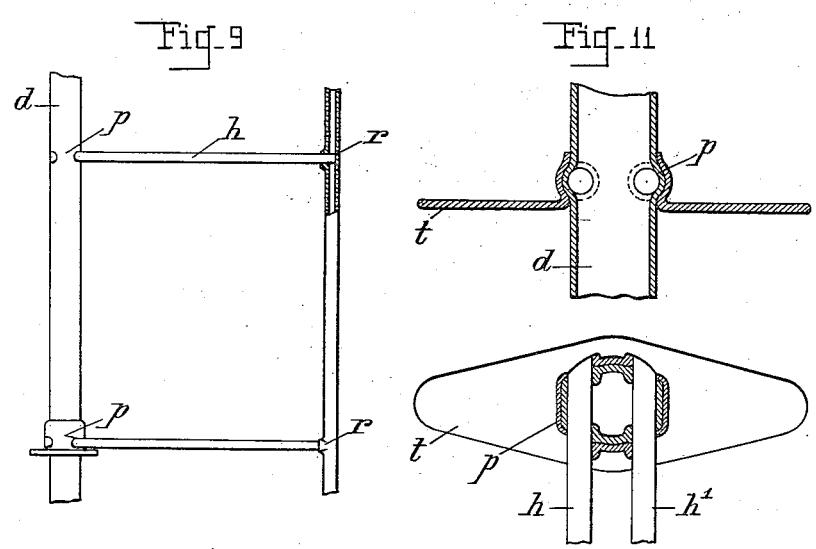
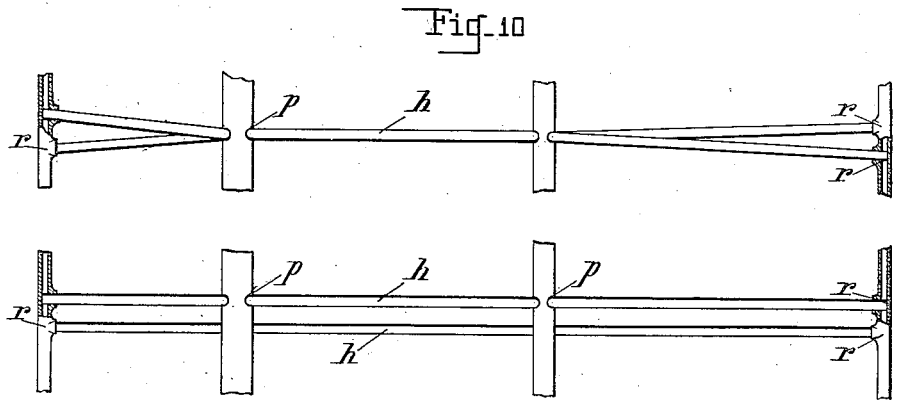

UNITED STATES PATENT OFFICE.

FELIX AMIOT, OF ISSY-LES-MOULINEAUX, FRANCE, ASSIGNOR TO SOCIÉTÉ D'EMBOUTISSAGE ET DE CONSTRUCTIONS MECANIQUES, OF PARIS, FRANCE, A FRENCH CORPORATION.

METHOD OF CONNECTING HOLLOW METAL PARTS.

1,250,411.  Specification of Letters Patent.  Patented Dec. 18, 1917.

Application filed September 20, 1916. Serial No. 121,197.

*To all whom it may concern:*

Be it known that I, FELIX AMIOT, citizen of Republic of France, and residing at Issy-les-Moulineaux, Seine, 32 Rue du Parc, have invented an Improved Method of Connecting Hollow Metal Parts, of which the following is a specification.

This invention has for its object to provide an improved method of connecting hollow metal parts which is effected by the arrangement of cylindrical bearings and half bearings formed in the metal parts to be connected.

This improved method of connecting, by dispensing with the use of welds or unions, makes it possible to construct light structures which are further of maximum strength owing to the fact that the metal is not weakened in any way by the action of the high temperature required by welding, and therefore retains all its original strength. With my improved method the connection or fixing of parts or tubes together or to other parts having a cylindrical portion may be readily accomplished; the bearings thus formed may serve as bearings for rotational or sliding movement, and may also comprise friction rings, if desired.

These bearings which are formed by means of special tools and machining operations on the actual parts, have the strength and lightness which render them especially applicable for use in the construction of all parts of apparatus for aviation and aeronautics, the construction of keelsons, trussed beams, cars, etc. This improved method of connecting may however be employed also in all branches of industries where there are connected in any manner hollow parts having cylindrical portions, more frequently tubes by means of autogenous welding or not, or by means of fused or cast unions, machined or not, as is the case in the manufacture of cycles, vehicles, piers, carpentry work, handrails, beds, conduit pipes.

In carrying out this improved method, viz., for forming a cylindrical bearing in a hollow part such, as a tube, for instance, the first operation consists in forming at the points where it is desired to provide these bearings, one or more preferably elongated apertures, the shape and dimensions of which depend on the thickness of the metal and the diameter of the bearing relatively to the diameter or section of the tube or hollow part in which the bearing is to be formed. The greatest dimension of this preferably elongated aperture is generally made slightly smaller than the diameter of the bearing when the latter has a diameter smaller than that of the tube or hollow part in which it is to be formed; in the contrary case it is made equal or larger.

These dimensions which may be determined by means of diagrams produced by plotting each factor with a quantitative and progressive value according to a determined order, vary also with the inclination of the axis of the bearing relatively to an imaginary axis drawn at right angles to the length of the part to be machined.

These apertures must be determined very exactly and must be machined with the greatest accuracy in order to avoid subjecting the metal to super-cold hardening which would alter the original strength of the metal and would produce articles of little strength and of no use.

In some cases and for certain values of the relations stated as functions of the circumferential development of the bearings and of the diameter or dimensions of the parts in which they are worked and as a direct function of the thickness of the metal, it will be necessary to effect a slight annealing which must be done with great care according to the value of the relation and at a temperature duly corresponding to the strain to be borne by the metal in order to produce articles which when worked up shall be equally strong and shall have the same hardness and elasticity as originally.

It is to be understood further that the temperature at which annealing is to be effected must vary according to the composition of the metal being worked.

This first operation being completed with all requisite care, the part to be worked is placed on a machine specially constructed for this purpose, after which there is introduced through the apertures formed therein and in the desired direction a tool of suitable shape which is subjected alternately to rotation in one and the other direction or in other words is rocked back and forth about its axis, the number of revolutions per minute being a function of its circumferential speed, viz., of its diameter. The pressure applied to the tool varies further according to each kind of work, but in order to give the best results it must be constant, this being easy to obtain by any mechanical arrangement and especially by employing a compressible medium such as air for instance. This pressure may be applied to the tool or its support or to the support for the part to be worked, the tool remaining stationary in this latter case, or it may receive simply a rotational movement.

The profile which the tool must have varies with each kind of work in order to produce bearings of exact dimensions and perfectly round shape with good collars or shoulders, and in order that the material shall be subjected neither to excessive elongation nor excessive contraction.

The characteristic features of these tools affect more particularly their shape, the desired degree of the slope and length of the cone, and the number and width of the facets which must be quite suitable and may be provided or not with a cutting angle or a clearing angle.

As a matter of fact a good tool should open out the material by successive passes, without rendering it thinner and without subjecting it to too great stresses; and it should work rapidly in order to give a good output and to produce articles which are exactly alike.

For the purpose of avoiding an excessive heating of the tool it will be well to lubricate it as well as the part being worked, preferably with oil or other cooling lubricant. For this purpose the tool may be provided with an internal conduit.

In the accompanying drawings: Figure 1 illustrates a tube, in elevation and section respectively, with the initial apertures formed therein; Fig. 2 is a longitudinal section of said tube showing the operating tool in position therein and one bearing completely formed; Fig. 3 illustrates the tube, in longitudinal sections and elevations, with the bearings completely formed; Fig. 4 illustrates cross-sections of various examples of operating tools for forming said bearings; Fig. 5 shows a tube, in section and exterior, in which the bearings are provided with an inner sleeve; Fig. 6 illustrates a tube, in section and exterior, formed with a half-bearing; Fig. 7 shows an exterior view of a tube in which the center line of the bearing is out of registry with the center line of the tube and a sectional view thereof on the line 1—2; Fig. 8 shows similar views illustrating a different form of tube; Figs. 9 and 10 illustrate structures adapted to be produced with my improved method and Fig. 11 illustrates, in vertical and horizontal section, another example of such structures.

Figs. 1, 2, 3 and 4, illustrate an example of the manner of putting into operation the hereinbefore described improved method of connecting.

Fig. 1, shows in side view and in longitudinal section a tube $a$ in which it is desired to form cylindrical bearings for the purpose of carrying into effect this improved method of connecting. $b$ $b^1$ are elongated apertures which have been cut previously therein, as hereinbefore specified, along an axis $x^2$ $x^2$ having a certain predetermined angle relatively to the line $x^1$ $x^1$ which is at right angles to the axis of the tube.

Fig. 2 is a longitudinal section of the same tube $a$, wherein the tool C has already been introduced for the purpose of forming the bearings, as shown at $p$ in Fig. 3. In Fig. 2 the shoulders $e$ are already formed on one side of the tube but they are not yet completed on the other side for the aperture $b'$ as will be seen from Fig. 2.

One form of the tool C is shown in side view at Fig. 2.

Fig. 4 illustrates, by way of example, sections of different forms of tools $C^1$, $C^2$, $C^3$, $C^4$, $C^5$, which can be employed according to the work to be done, and the dimensions and thickness of the parts to be worked.

Fig. 3 illustrates in longitudinal sections and side views taken at 90° apart, the tube $a$ wherein the bearings $p$ with bearing shoulders $e$ are completely formed in the tube $a$.

Fig. 5 illustrates in longitudinal section and side view a tube $a$ constructed with bearings for rotational or sliding movement therein. In this case the tube $a$, which may be reinforced if necessary, by another tube such as $f$ driven tight or hooped thereon, is prepared as hereinbefore described, after which there is inserted into the bearings thus formed an inner sleeve of gunmetal or other material $g$ which is fixed in place by any suitable means such as by having its edges beaded over, in order to serve as the actual bearing that takes the wear.

In the case of bearings that are not subjected to much friction this inner sleeve may be omitted.

Fig. 6 illustrates in longitudinal section and side view a half-bearing $r$ which can be used with advantage where it is desired to connect one part end-on to the other part. The work is done as hereinbefore described, but only one aperture is formed in the tube $a$. With this construction special tools will sometimes have to be used because the depth is often limited in such cases.

Figs. 7 and 8 illustrate respectively in side view and in cross section on the line 1—2 of Fig. 7, constructions wherein the center line of the bearings is situated in a different plane from that of the center line of the hollow part. These constructions are more particularly designed for use where it is a question of making bearings of small diameter in parts $d$ of relatively larger size. $h$ is a tie-tube inserted in one of these bearings.

Fig. 8 shows in particular the connection of two tie-tubes $h$ at the inner and outer sides of a longitudinal $d$, of an aviation apparatus constructed according to this invention.

For certain types of balancing devices and auxiliary planes or rudders, the tie-tubes $h$ may be stopped short as shown in Fig. 9, at one of their ends in bearings $p$ and at their other end in half-bearings $r$.

Fig. 10 is a plan view of a construction with bearings $p$ and half-bearings $r$ at the ends.

The deformation of the metal at the bearings and the insertion of tie-tubes in these bearings may serve for fixing tillers or control levers for controlling these rudders or auxiliary planes. The tiller or control lever has then a bearing collar preferably fixed with a driving fit upon the longitudinal tube on which it is to be mounted. In such cases the bearings may be formed at the desired place directly upon the neck of the tiller $t$ as shown in sectional elevation and in sectional plan in Fig. 11.

Having now particularly described and ascertained the nature of my said invention and in what manner the same is to be performed, I declare that what I claim is:

1. The method of connecting hollow metal parts by means of cylindrical bearings and half-bearings in the metal parts to be connected, by first forming at the place where it is desired to have the said bearings, elongated apertures located with great exactness and worked with great care, into which there is then introduced a tool of suitable shape which is subjected to a constant pressure varying according to the circumstances of each case and alternately to rotational movement in one and the other direction, the connection thus made being then, if desired, secured in any manner, preferably by means of a drop of tin solder or a pin.

2. The method of forming bearings in metal parts which consists in forming an elongated aperture therein and spreading the periphery of said aperture transversely until the same becomes circular.

3. The method of forming annular bearings in metal parts which consists in initially forming an aperture in said metal part, introducing a suitable tool into said aperture, and rocking said tool in contact with the periphery of said aperture under pressure whereby the metal at said periphery is spread transversely.

4. The method of forming annular bearings in metal tubes which consists in initially forming an elongated aperture in said tube and working said aperture into circular form by gradually spreading the metal along the periphery thereof in a transverse direction to form an annular shoulder.

5. The method of forming annular bearings in metal tubes which consists in initially forming a pair of opposed apertures in said tube, introducing a suitable tool into said apertures and rocking said tool in contact successively with the peripheries of said apertures under pressure whereby the metal along said peripheries is gradually spread transversely and formed into annular shoulders.

In testimony whereof I have signed my name to this specification in the presence of two subscribing witnesses.

FELIX AMIOT.

Witnesses:
   JULES FAYOLLET,
   JULES DELALIEUX.